No. 694,665. Patented Mar. 4, 1902.
F. F. RAYMOND, 2d.
HEEL NAILING MACHINE.
(Application filed Dec. 17, 1889.)
(No Model.) 6 Sheets—Sheet 1.

WITNESSES
J. M. Dolan
A. P. Porter

INVENTOR

No. 694,665. Patented Mar. 4, 1902.
F. F. RAYMOND, 2d.
HEEL NAILING MACHINE.
(Application filed Dec. 17, 1889.)

(No Model.) 6 Sheets—Sheet 3.

WITNESSES INVENTOR

No. 694,665. Patented Mar. 4, 1902.
F. F. RAYMOND, 2d.
HEEL NAILING MACHINE.
(Application filed Dec. 17, 1889.)
(No Model.) 6 Sheets—Sheet 4.

WITNESSES.
J. M. Dolan.
A. P. Porter.

INVENTOR.

No. 694,665. Patented Mar. 4, 1902.
F. F. RAYMOND, 2d.
HEEL NAILING MACHINE.
(Application filed Dec. 17, 1889.)
(No Model.) 6 Sheets—Sheet 5.
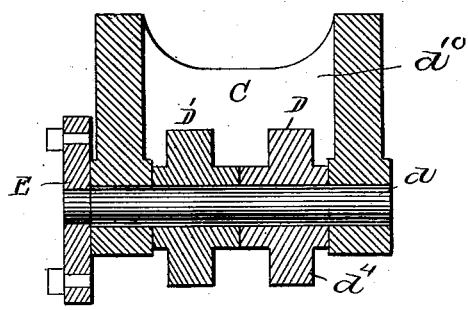
Fig-7-
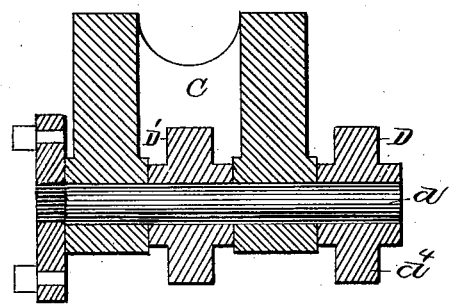
Fig-8-
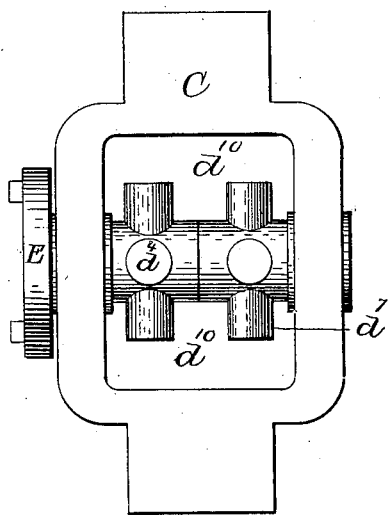
Fig-9-
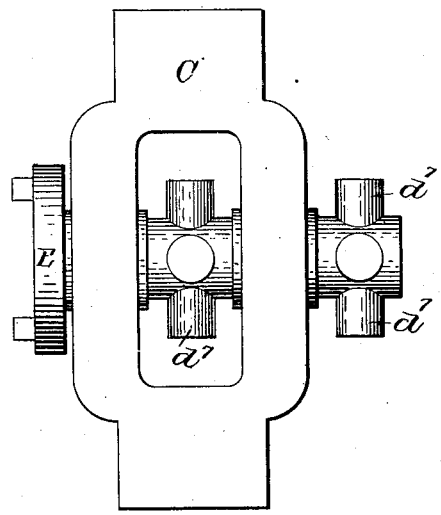
Fig-10-
WITNESSES
J. W. Dolan
A. P. Porter
INVENTOR
F. F. Raymond 2d No. 694,665. Patented Mar. 4, 1902.
F. F. RAYMOND, 2d.
HEEL NAILING MACHINE.
(Application filed Dec. 17, 1889.)

(No Model.) 6 Sheets—Sheet 6.

WITNESSES.
J. M. Dolan
A. P. Porter

INVENTOR.
F. F. Raymond

UNITED STATES PATENT OFFICE.

FREEBORN F. RAYMOND, 2D, OF NEWTON, MASSACHUSETTS, ASSIGNOR, BY MESNE ASSIGNMENTS, TO THE UNITED SHOE MACHINERY COMPANY, A CORPORATION OF NEW JERSEY.

HEEL-NAILING MACHINE.

SPECIFICATION forming part of Letters Patent No. 694,665, dated March 4, 1902.

Application filed December 17, 1889. Serial No. 334,109. (No model.)

*To all whom it may concern:*

Be it known that I, FREEBORN F. RAYMOND, 2d, a citizen of the United States, and a resident of Newton, in the county of Middlesex and State of Massachusetts, have invented a new and useful Improvement in Heel-Nailing Machines, of which the following is a full, clear, and exact description, reference being had to the accompanying drawings, forming a part of this specification, in explaining its nature.

The invention relates to a heel-nailing machine having a duplex organization whereby two heels and top lifts are attachable to their respective boots or shoes simultaneously.

Figure 1:
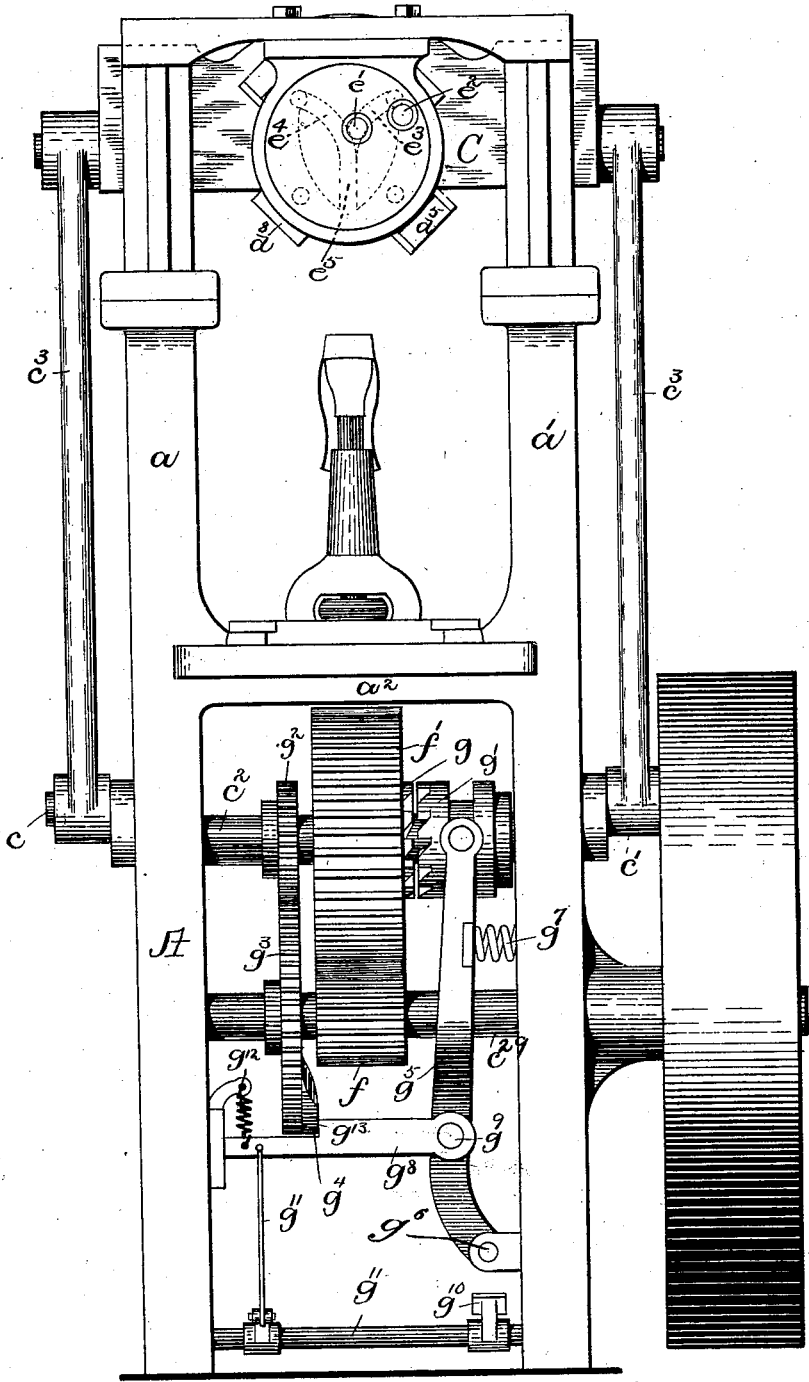
Figure 2:
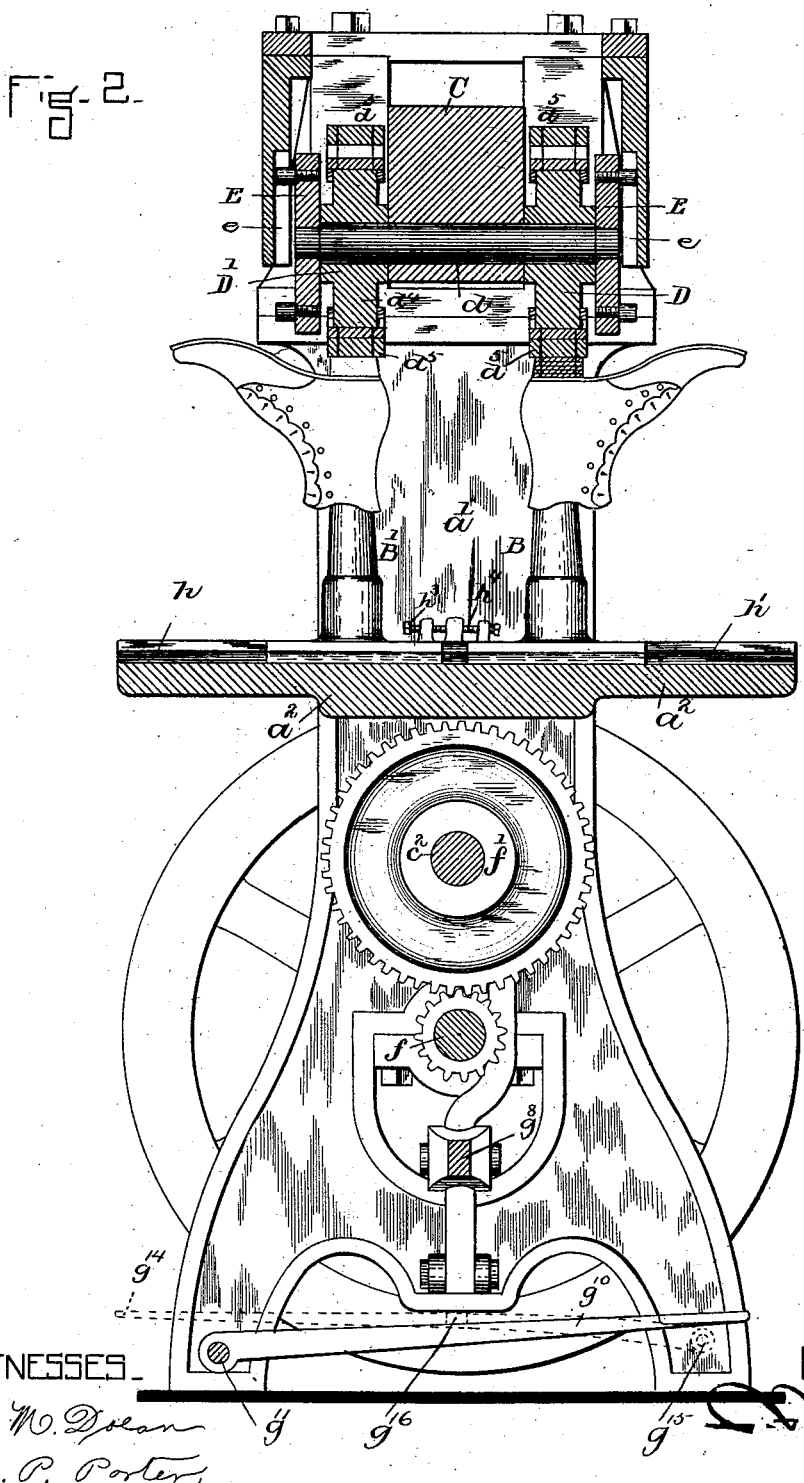
Figure 3:
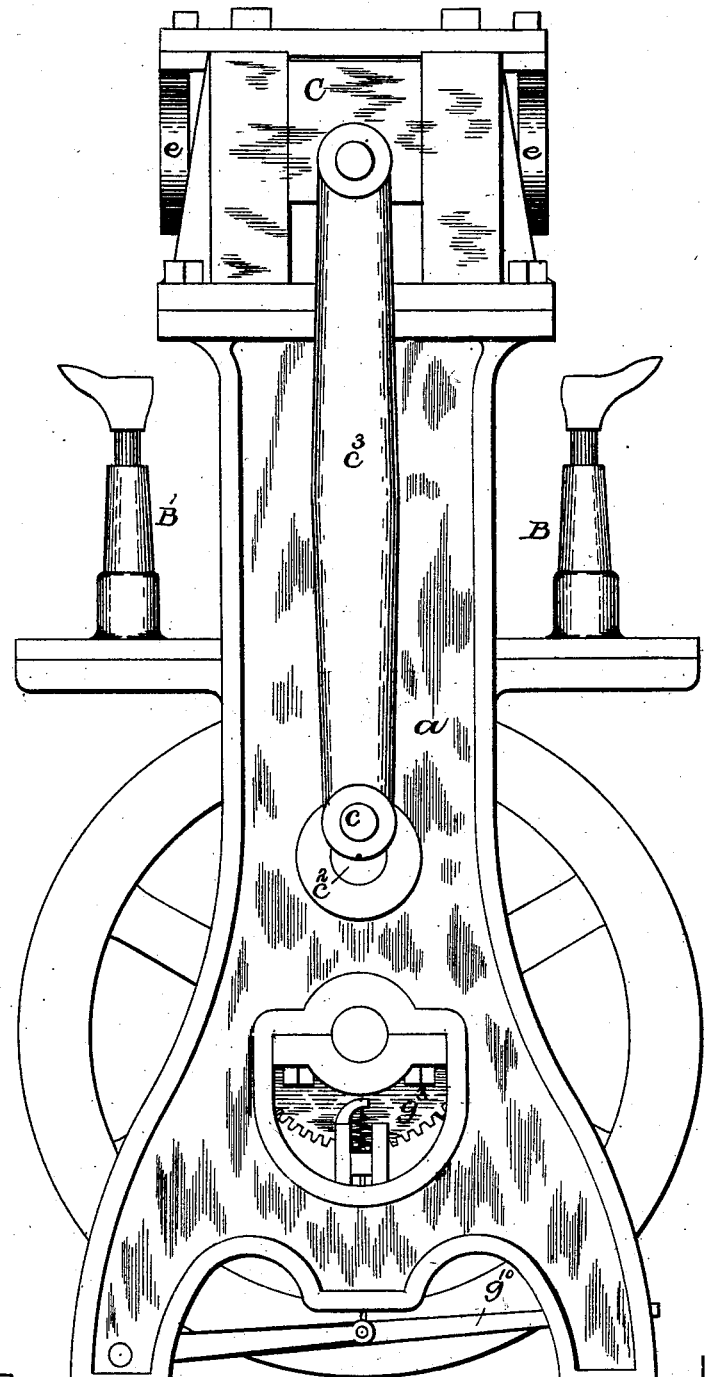
Figure 4:
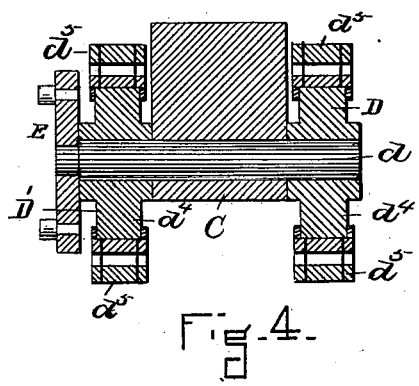
Figure 6:
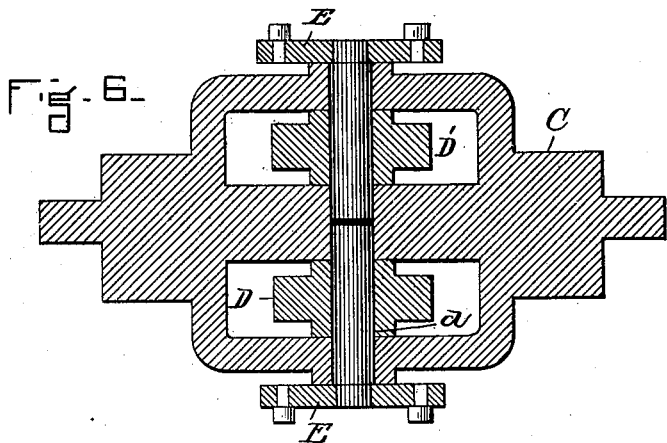
Figure 5:
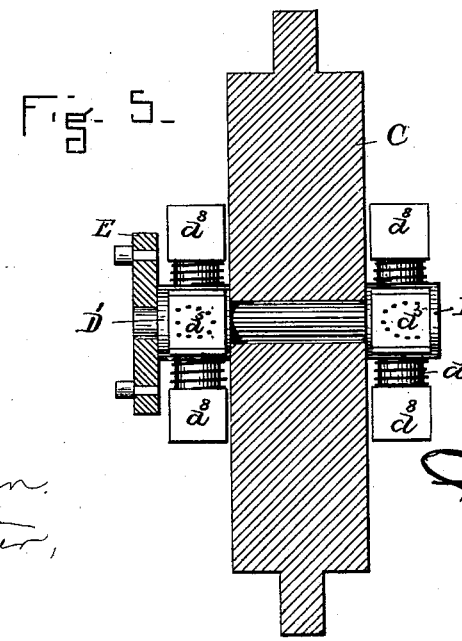
Figure 11:
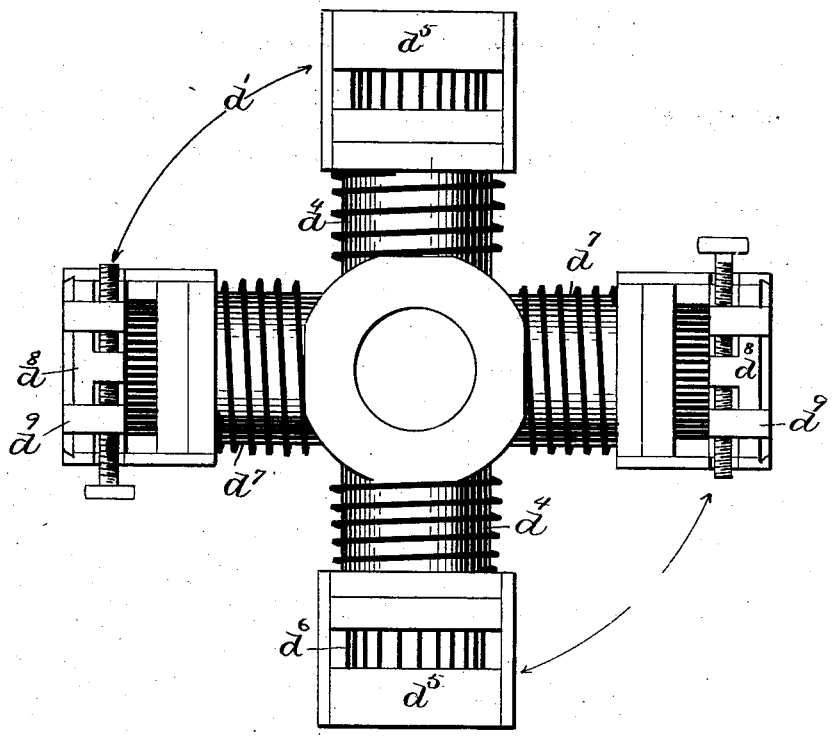
Figure 12:
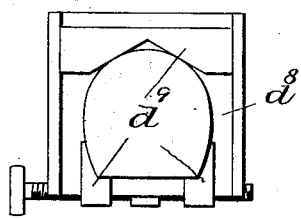

In the drawings, Figure 1 is a view in front elevation of a machine having the features of my invention. Fig. 2 is a view in vertical central section thereof, taken from one front to the other front of the machine. Fig. 3 is a view in side elevation of the machine. Fig. 4 is a view in vertical section crosswise the cross-head to illustrate one form of carrying the two rotary heads. Fig. 5 is a view, partly in plan and partly in horizontal section, thereof. Fig. 6 is a view to illustrate another form of supporting and operating the two rotary heads. Fig. 7 is a view in vertical section of a cross-head and rotary heads, illustrating still another form of supporting and operating the two rotary heads. Fig. 8 is a view in vertical section of a cross-head and rotary heads, showing still another method of operating the same. Fig. 9 is a view in plan of the construction shown in Fig. 7. Fig. 10 is a view in plan of the construction shown in Fig. 8. Fig. 11 is a view, enlarged, of one of the rotary heads. Fig. 12 is a top view of a spanker-block, showing the top-lift holder.

A represents the frame of the machine. It preferably comprises the side frames $a\ a'$ and the cross-bed $a^2$, integral with the side frames. The frame is open from front to back, or has what might be termed "two fronts," and the bed supports the two jacks B B', placed back to back, separated by any desired distance. These jacks may be horizontally movable upon the bed or may simply be horizontally adjustable thereon.

C is the cross-head. It is reciprocated, preferably, by means of the cranks $c\ c'$ on the shaft $c^2$ and the connecting-rods $c^3$. It has a cross-shaft $d$, upon which is mounted the rotary head D and the rotary head D'. Each head carries heel-attaching devices. Each of the heads represented has two groups of attaching devices adapted to be successively used—namely, the groups $d'\ d^2$—and each group comprises the arm $d^4$, supporting a vertically-movable templet $d^5$ and drivers $d^6$, and the arm $d^7$, supporting the top-lift spanker-block $d^8$, having a top-lift holder $d^9$ and which may or may not be vertically movable in relation to the arm $d^7$, it being so movable when it is fitted to act additionally as a templet in connection with drivers carried by the arm $d^7$ in driving additional slugs or nails through the spanked top lift of the heel. The cross-head C may have the wide opening $d^{10}$ (see Figs. 7 and 9) sufficient in extent to receive the two rotary heads D D', or one rotary head may be supported in the opening of the cross-head and the other on either side thereof, as represented in Figs. 8 and 10, or the cross-head may be solid, as represented in Fig. 2, and support the rotary heads on each side thereon. The shaft $d$ is represented as carrying at both ends a turning disk E, and each turning disk acts in conjunction with the turning device $e$, similar to that described in my Patent No. 570,648, dated November 3, 1896, and comprises, essentially, the latches $e'\ e^2$, the turning surfaces $e^3\ e^4$, and the holding guide-groove $e^5$. While one of the sets of shaft-turning devices would answer, I prefer for the purpose of insuring a stronger construction to employ two. The shaft $c^2$ is rotated as described in my said patent, and a similar stop-motion for stopping the machine at the end of the second reciprocation of the cross-head is employed. In lieu of placing the balance-wheel described in said patent upon the said shaft it may be mounted upon a separate short shaft $c^{29}$, rotated more rapidly and connected with the shaft $c^2$ by a pinion $f$ and gear $f'$, as represented in Fig. 1.

I would say that I do not confine myself to the number of arms carried by each of the rotary heads; neither would I confine myself to a cross-head for rotary heads, as a cross-head for two slide-heads would answer the purposes of the invention, though perhaps not as well as would the rotary heads, the essential feature of this part of the invention being to provide, first, means for the simultaneous driving, without the addition of intermediate templets located between the head and the jack, of two gangs or groups of nails into two distinct heels or pieces of work; second, the driving of two sets of nails and the spanking of two top lifts and, if desired, the driving of additional slugging-nails by the movement into position successively of the nail-driving devices and top-lift applying devices by said cross-head and arms carried thereby without the intervention of auxiliary applying mechanism, and for various methods of actuating arms, supporting nail-driving devices, and top-lift appliances I would refer especially to Patent No. 410,194. I would say, further, that I do not confine myself to the use of this mechanism for attaching heels, as it may be used for any purpose where it is desirable or possible to drive two gangs or groups of nails simultaneously; but where used for heel-attaching I would say that it can be used for attaching loaded heel-blanks in which the nails are flush-driven or heel-blanks which are attached by blind-nailing and to which the top lifts are subsequently attached or heels which are blind-nailed and have their top lifts blind-nailed and slugged.

In operation when the rotary heads are employed, and this, as I have above said, is the preferable construction, an operator stands at one front of the machine, with his last or work-support, and a boy or attendant upon the other side of the machine with his last or work-support. Another boy or attendant is stationed upon one side of the machine to place the loaded heel-blanks or heel-blanks and top lifts upon the faces of the operating-arms as they are successively brought into upright position, whereby their surfaces are exposed to him and he can quickly place them. This attendant, confining his work to one of the rotary heads, upon the same side or opposite side of the machine, as may be preferred, is another boy or attendant who loads the other rotary head with loaded heel-blanks and top lifts in the same manner. The operator and his assistant each places a shoe upon his last or work-support, and I would here say the last or work-support may remain in position under its respective rotary head or may be moved outward upon its bed or support to receive the shoe, and then be moved inward. With a machine having the form shown in the drawings this horizontal movement of the jack is unnecessary, as the work can be placed upon the jacks while they are in position under the head, there being room to enable this to be done upon all sides of the machine. The shoes having been thus jacked, the operator then sets the machine in operation. If the heels to be attached are to be flush-nailed, the cross-head makes but a single reciprocation. As illustrated in the drawings, the cross-head is adapted to make two reciprocations and, as shown in Fig. 2, to blind-nail and apply a top lift, and the cross-head then makes two reciprocations, first locating the heels upon the heel-seats of the shoes and driving their attaching-nails and then applying the top lifts. The heeled shoes are then removed and others substituted for them.

It will be seen that by this organization a duplex nailing-machine is obtained wherein the frame and most of the working parts are the same as those of a single machine, the only duplication being in the jacks and in the nail-driving devices carried by the cross-head, and that this duplex organization practically doubles the capacity of the machine, while its cost is increased but slightly. The organization also permits the simultaneous attaching of heels of different sizes—that is, one of the organizations may be used for attaching heels of one size, while the other is used for attaching heels of a different size. I would say that it is not necessary that the two rotary heads be simultaneously rotated or rotated by the same mechanism, as they may be separately or independently rotated or turned, if desired.

The start and stop motion mechanism is represented in Fig. 1 and is there shown as arranged to stop the machine after the second reciprocation of the cross-head. It is located between the two side frames of the machine below the table $a^2$. It comprises the member $g$ of a clutch fastened to the gear $f'$, which is free to turn upon the shaft $c^2$, and the member $g'$ of the clutch, which is splined upon the shaft $c^2$ to slide thereon. The shaft $c^2$ also has a small gear $g^2$, which is connected with a larger gear $g^3$ on the main shaft $c^{29}$. This gear $g^3$ carries a cam-stop $g^4$. The member $g'$ of the clutch is connected with the lever $g^5$ by pin-and-groove construction. This lever is pivoted at $g^6$ and is movable in one direction by the spring $g^7$ and in the reverse direction by the cam-stop $g^4$ through the medium of a latch $g^8$, which is pivoted to the lever at $g^9$ and is connected with the treadle $g^{10}$ by a rod and rock-shaft $g^{11}$. A spring $g^{12}$ serves to keep the latching-surface $g^{13}$ of the lever in position to be engaged by the cam-stop $g^4$. In operation the gear $f'$ constantly rotates on the shaft $c^2$. To start the machine, the latch $g^8$ is moved downward by the treadle sufficiently to disengage the latching-surface $g^{13}$ from the cam-stop $g^4$. This permits the spring $g^7$ to throw the member $g'$ of the clutch into engagement with the member $g$ on the driven gear $f'$, and as the gears $g^2$ $g^3$ are two to one the shaft $c^2$ makes two rotations to one of the gear $g^3$, which is loose upon the shaft $c^2$, and upon the coming of the stop-cam $g^4$ into line with the latching-surface $g^{13}$ of the lever $g^8$ the member $g'$ of the clutch is moved from contact with the member $g$. I have illustrated the start-motion mechanism as operated from both fronts of the machine by means of the treadle $g^{10}$ and an additional treadle $g^{14}$, pivoted at $g^{15}$ and having a lug $g^{16}$, which rests upon the upper surface of the lever $g^{15}$. (See Fig. 2.) This permits the machine to be started from both its fronts by the same start-motion mechanism.

It will be seen that the table $a^2$ extends from each front of the machine and furnishes a guideway $h\ h'$, in which each jack is movable toward its front of the machine, and the stops $h^3\ h^4$ limit the extent of the inward movement of the jacks.

I would say that for certain kinds of nailing both rotary heads may have heel-attaching devices only or the rotary heads may be replaced by two stationary arms carrying the heel-attaching devices.

Having thus fully described my invention, I claim and desire to secure by Letters Patent of the United States—

1. The combination in a heel-nailing machine, of a cross-head having a central cavity, a suitable support extending through said cavity and beyond one surface of said cross-head, and two heads each carrying heel nailing or attaching devices, and mounted on said support, one within said cavity and one upon the outer wall of said cross-head, as and for the purposes set forth.

2. In a heel-attaching machine the combination of a machine-frame having two fronts, a common bed, two lasts or work-supports mounted upon said bed back to back, a common reciprocating head, two sets of heel-attaching and top-lift carrying and spanking devices attached to said head having operative relation respectively with the said lasts or work-supports, and each of which heel-attaching and top-lift carrying and spanking devices are movable from an inoperative to an operative position and are simultaneously reciprocated, as and for the purposes set forth.

FREEBORN F. RAYMOND, 2D.

In presence of—
J. M. DOLAN,
W. P. PORTER.